US012709722B2

(12) United States Patent
Brandt Sanz et al.

(10) Patent No.: US 12,709,722 B2
(45) Date of Patent: Aug. 18, 2026

(54) METHOD OF MANUFACTURING A DETERGENT WATER-SOLUBLE POUCH

(71) Applicant: The Procter & Gamble Company, Cincinnati, OH (US)

(72) Inventors: Miguel Brandt Sanz, Etterbeek (BE); Kristof Bert Donne, Antwerp (BE); Frank Emile Louis Triest, Hof ten Bergestraat (BE); Reinhard Waerlop, Tremelo (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/521,214

(22) Filed: Nov. 28, 2023

(65) Prior Publication Data

US 2024/0182824 A1 Jun. 6, 2024

(30) Foreign Application Priority Data

Dec. 2, 2022 (EP) .................................... 22211206

(51) Int. Cl.
*B65B 1/02* (2006.01)
*B65B 1/04* (2006.01)
(Continued)

(52) U.S. Cl.
CPC .............. *C11D 17/045* (2013.01); *B65B 1/02* (2013.01); *B65B 1/04* (2013.01); *B65B 7/2878* (2013.01);
(Continued)

(58) Field of Classification Search
CPC .......... B65B 2220/14; B65B 2009/047; B65B 57/00; B65B 37/00; B65B 9/042;
(Continued)

(56) References Cited

U.S. PATENT DOCUMENTS 3,218,776 A * 11/1965 Cloud ..................... B65B 47/10 53/546
4,060,648 A 11/1977 Taylor-Brown et al.
(Continued)

FOREIGN PATENT DOCUMENTS

| | | | |
|---|---|---|---|
| EP | 0432126 | B1 | 10/1994 |
| EP | 1621167 | A2 | 2/2006 |
| JP | 2008296951 | A | 12/2008 |

OTHER PUBLICATIONS

All Office Actions; U.S. Appl. No. 18/526,183, filed Dec. 1, 2023
(Continued)

*Primary Examiner* — Anna K Kinsaul
*Assistant Examiner* — Mary C Hibbert-Copeland
(74) *Attorney, Agent, or Firm* — Elizabeth A. Conklin; Carolyn S. Powell

(57) ABSTRACT

A continuous method of manufacturing a detergent water-soluble pouch includes providing a first water-soluble film moving in a first direction, and forming a cavity in the first water-soluble film; providing a feed of first detergent particles to a rotating discretizing element comprising at least one pocket, rotating the loaded pocket of the rotating discretizing element from the first portion of the rotating arc to the second portion of the rotating arc, and dosing the first detergent particles from the loaded pocket to the cavity of the first water-soluble film when the loaded pocket is in a position within the second portion of the rotating arc, to form a loaded cavity.

15 Claims, 2 Drawing Sheets

(51) Int. Cl.

| | |
|---|---|
| ***B65B 7/28*** | (2006.01) |
| ***B65B 9/04*** | (2006.01) |
| ***B65B 37/00*** | (2006.01) |
| ***B65B 57/00*** | (2006.01) |
| ***C11D 17/04*** | (2006.01) |

(52) U.S. Cl.

CPC .............. *B65B 9/042* (2013.01); *B65B 37/00* (2013.01); *B65B 57/00* (2013.01); *B65B 2009/047* (2013.01); *B65B 2220/14* (2013.01); *C11D 2111/12* (2024.01); *C11D 2111/14* (2024.01)

(58) Field of Classification Search

CPC B65B 7/2878; B65B 1/02; B65B 1/04; C11D 2111/12; C11D 2111/14; C11D 17/045

USPC .......................................................... 53/454

See application file for complete search history.

(56) References Cited

U.S. PATENT DOCUMENTS

| | | | |
|---|---|---|---|
| 5,030,314 | A | 7/1991 | Lang |
| 7,849,889 | B2 | 12/2010 | Smith |
| 2004/0144064 | A1 | 7/2004 | Viltro |
| 2015/0291300 | A1* | 10/2015 | Brandt Sanz ........... B65B 41/16 53/64 |
| 2015/0336691 | A1 | 11/2015 | Fowler et al. |
| 2016/0228299 | A1 | 8/2016 | Jackels |
| 2016/0228909 | A1 | 8/2016 | Marduel |
| 2016/0340068 | A1 | 11/2016 | Brandt Sanz |
| 2017/0101204 | A1 | 4/2017 | Waterman |
| 2019/0234023 | A1 | 8/2019 | Pratt et al. |
| 2019/0283068 | A1 | 9/2019 | Frank et al. |
| 2020/0307139 | A1 | 10/2020 | Kitamura et al. |

OTHER PUBLICATIONS

All Office Actions; U.S. Appl. No. 18/526,192, filed Dec. 1, 2023.

Extended EP Search Report and Search Opinion for 22211206.2 dated Jul. 24, 2023, 5 pages.

Unpublished U.S. Appl. No. 18/526,183, filed Dec. 1, 2023, to Justin Thomas Cacciatore et. al. (See PAIR).

Unpublished U.S. Appl. No. 18/526,192, filed Dec. 1, 2023, to Justin Thomas Cacciatore et al.

* cited by examiner

METHOD OF MANUFACTURING A DETERGENT WATER-SOLUBLE POUCH

TECHNICAL FIELD

The present disclosure relates to a continuous method of manufacturing a detergent water-soluble pouch. The method enables efficient and accurate dosing of detergent particles to the compartment of the detergent water-soluble pouch without decreasing the production rate of the process. The method uses a rotating discretizing element that rotates at varying speeds. This enables the rotational speed to be used to ensure efficient and consistent dosing, but then the rotational speed changes to ensure that the rotating discretizing element matches the frequency of the process, namely the frequency at which the cavities that form the compartment of the detergent water-soluble pouch arrive at their filling position.

BACKGROUND

Detergent water-soluble pouches are highly desired by consumers, especially automatic dishwashing and laundry consumers. These detergent water-soluble pouches allow case of use in that the consumer can easily and simply dose the desired number of pouches into their washing process. This is much easier compared to having pour liquid or powder into the washing process, which can be very difficult to accurately dose the correct amount of detergent, and for some consumers may also be physically difficult.

However, the method of manufacturing detergent water-soluble pouches is complicated with many steps being required to form the water-soluble pouch and dose the required amount of ingredients into the water-soluble pouch in an efficient and consistent manner.

Typically, a first water-soluble film is formed into a cavity, into which bulk detergent, such as a detergent composition, is dosed, and the cavity is sealed by a second water-soluble film. The process of dosing the detergent composition into the cavity can be inefficient and controlling the consistency of the chemistry that is dosed into the cavity can be challenging. This is especially problematic for those ingredients, such as enzymes, that are typically present at only very low levels in the detergent composition.

One means of dosing detergent composition into the cavity of the first water-soluble film is by using a rotating discretizing element. This has the advantage that accurate and consistent dosing can be achieved but has the disadvantage in that the speed of the loading the pockets of the rotating discretizing element often become the rate limiting step of the process. This is because the process is typically continuous and the speed at which the cavities move along the process needs to be matched to the speed at which the rotating discretizing element can be operated at, e.g., the speed at which the pockets are loaded. This usually means the speed at which the cavities move is decreased. Any means that enable the speed at which the cavities move in the process to be increase increases the efficiency and production rate of the process.

The inventors have found that a rotating discretizing element can be used in a process to make a detergent water-soluble pouch, which provides the benefits of accurate and consistent dosing can be achieved, but that the speed of this dosing can be decoupled and divorced from the rate at which the cavities move through the process.

The inventors have provided a process whereby the rotational speed of the rotating discretizing element is varied in that the the rotating discretizing element rotates at variable speeds This means that the rotational speed that is used to control the loading the pockets to form loaded pockets, can be changed, e.g., increased or decreased, to ensure that the unloading of the loaded pockets into the cavity is matched to the frequency at which the cavity passes through the position from which it can be filled from the loaded pocket.

One particularly preferred process uses a rotating discretizing element to dose first detergent particles, such as enzyme particles, to the cavity of the first water-soluble pouch, and then combines this with a dose, preferably a subsequent dose, of second detergent ingredients, preferably second detergent composition, to the cavity of the first water-soluble film.

SUMMARY

The present disclosure provides a continuous method of manufacturing a detergent water-soluble pouch, wherein the pouch comprises a first compartment that is enclosed by a first water-soluble film and a second water-soluble film, wherein the first water-soluble film is sealed to the second water-soluble film, wherein the first compartment comprises a detergent composition, wherein the detergent composition comprises first detergent particles and optionally second detergent ingredients, wherein the method comprises the steps of:

(a) providing a first water-soluble film moving in a first direction, and forming a cavity in the first water-soluble film;

(b) providing a feed of first detergent particles to a rotating discretizing element comprising at least one pocket, wherein the rotating discretizing element rotates through a rotating arc, wherein the rotating arc has a first portion and a second portion, wherein the first detergent particles are dosed into the pocket when the pocket is in a position within the first portion of the rotating arc, to form a loaded pocket;

(c) rotating the loaded pocket of the rotating discretizing element from the first portion of the rotating arc to the second portion of the rotating arc, (d) dosing the first detergent particles from the loaded pocket to the cavity of the first water-soluble film when the loaded pocket is in a position within the second portion of the rotating arc, to form a loaded cavity;

(e) optionally, dosing second detergent ingredients to the cavity of the first water-soluble film;

(f) providing a second water-soluble film moving in the first direction, and placing the second water-soluble film over the cavity of the first water-soluble film and contacting the second water-soluble film to the first water-soluble film;

(g) sealing the first water-soluble film to the second water-soluble film and entrapping at least a portion of the first detergent particle and optionally at least a portion of the second detergent ingredients to form the first compartment; and (h) repeating steps (a) to (g);

wherein the rotating discretizing element rotates at variable speeds, wherein the rotating speed of the rotating discretizing element when the pocket is not in a position within the first portion of the rotating arc is controlled so that the dosing of the first detergent particles into the cavity during step (d) is matched to the frequency at which the cavity passes through the position from which it can be filled with first detergent particles.

DETAILED DESCRIPTION

Figure 1:
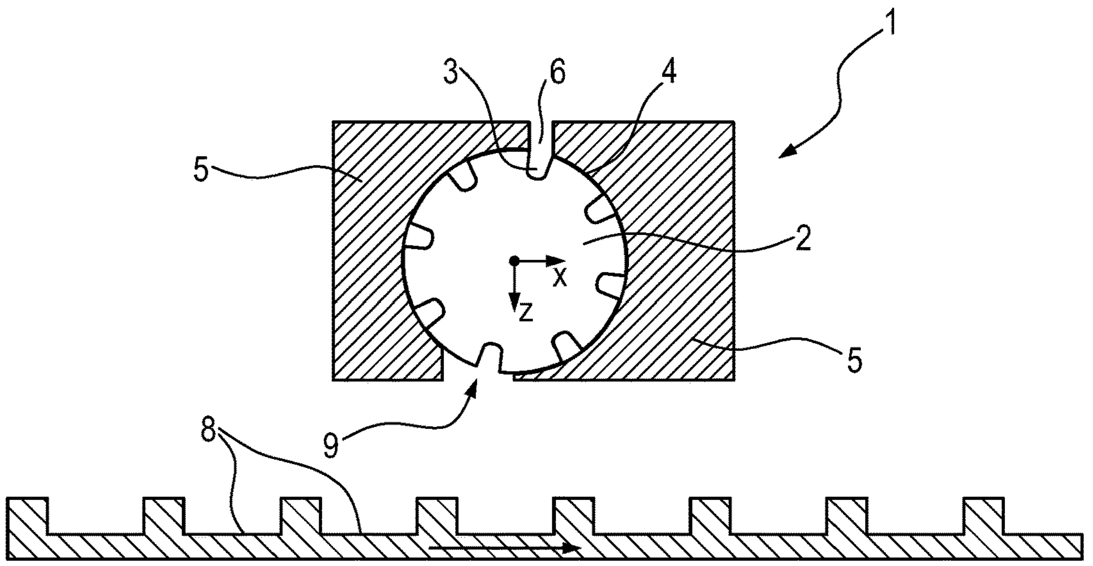
FIG. 1 illustrates the rotating discretizing element.
Figure 2:
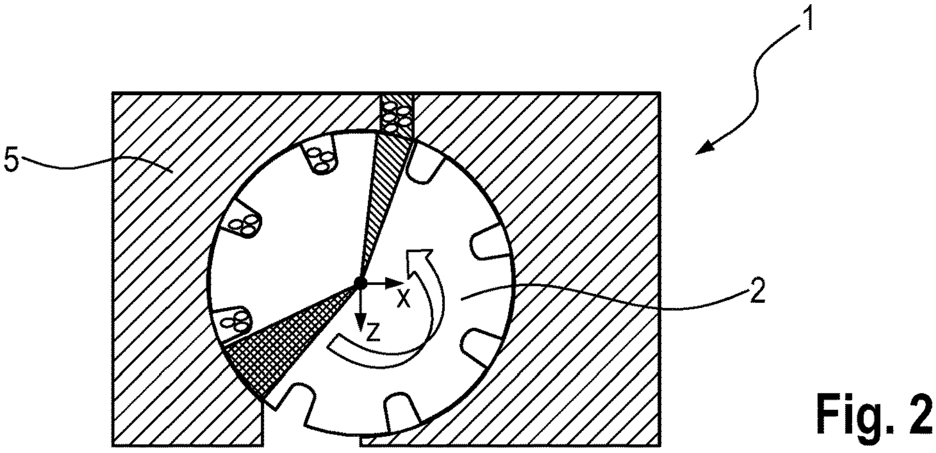
FIG. 2 illustrates the rotating discretizing element with particles.
Figure 3:
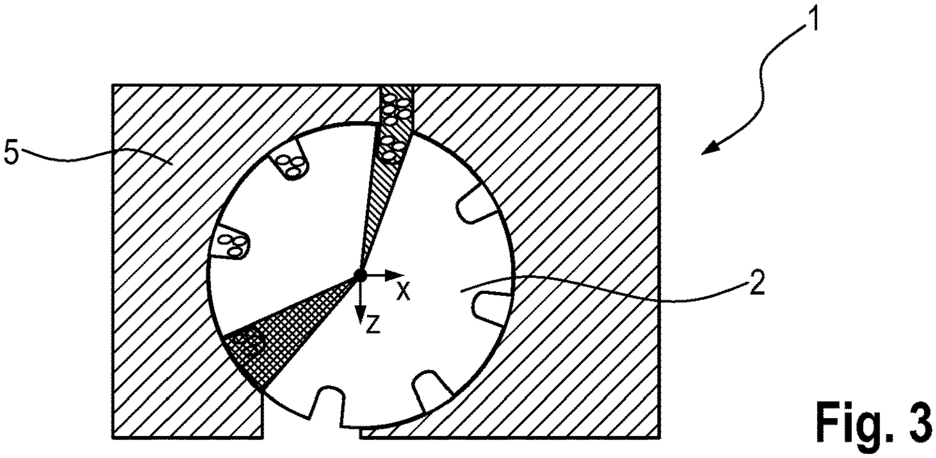
FIG. 3 illustrates the rotating discretizing element with particles transferring to the pocket.
Figure 4:
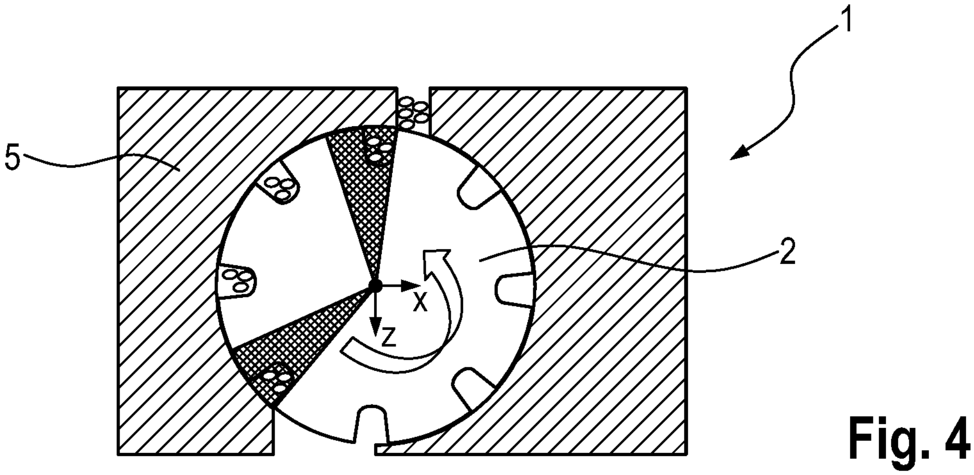
FIG. 4 illustrates the rotating element with detergent particles.
Figure 5:
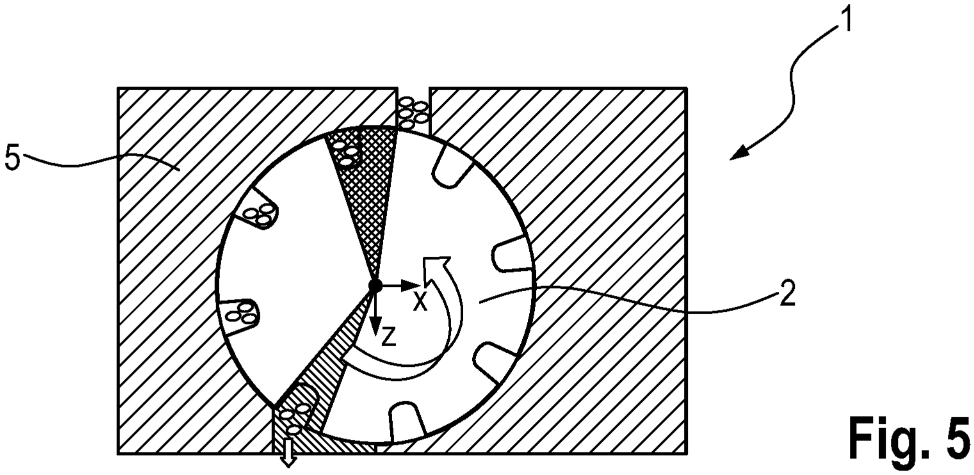
FIG. 5 illustrates the rotating element with detergent particles transferring to the cavity.

Method of Manufacturing a Detergent Water-Soluble Pouch

The present disclosure provides a continuous method of manufacturing a detergent water-soluble pouch, wherein the pouch comprises a first compartment that is enclosed by a first water-soluble film and a second water-soluble film, wherein the first water-soluble film is sealed to the second water-soluble film, wherein the first compartment comprises a detergent composition, wherein the detergent composition comprises first detergent particles and optionally second detergent ingredients, wherein the method comprises the steps of:

(a) providing a first water-soluble film moving in a first direction, and forming a cavity in the first water-soluble film;

(b) providing a feed of first detergent particles to a rotating discretizing element comprising at least one pocket, wherein the rotating discretizing element rotates through a rotating arc, wherein the rotating arc has a first portion and a second portion, wherein the first detergent particles are dosed into the pocket when the pocket is in a position within the first portion of the rotating arc, to form a loaded pocket;

(c) rotating the loaded pocket of the rotating discretizing element from the first portion of the rotating arc to the second portion of the rotating arc, (d) dosing the first detergent particles from the loaded pocket to the cavity of the first water-soluble film when the loaded pocket is in a position within the second portion of the rotating arc, to form a loaded cavity;

(e) optionally, dosing second detergent ingredients to the cavity of the first water-soluble film;

(f) providing a second water-soluble film moving in the first direction, and placing the second water-soluble film over the cavity of the first water-soluble film and contacting the second water-soluble film to the first water-soluble film;

(g) sealing the first water-soluble film to the second water-soluble film and entrapping at least a portion of the first detergent particle and optionally at least a portion of the second detergent ingredients to form the first compartment; and (h) repeating steps (a) to (g);

wherein the rotating discretizing element rotates at variable speeds, wherein the rotating speed of the rotating discretizing element when the pocket is not in a position within the first portion of the rotating arc is controlled so that the dosing of the first detergent particles into the cavity during step (d) is matched to the frequency at which the cavity passes through the position from which it can be filled with first detergent particles.

Preferably, the rotational speed of the rotating discretizing element during the first portion of the rotating arc when the first detergent particles are dosed into the pocket to form a loaded pocket is higher than the average rotational speed of the rotating discretizing element during the remainder of the rotating arc.

Typically, the change in rotating speed of the rotating discretizing element occurs between the steps of loading two subsequent pockets.

The equipment for the process can be in a configuration of multiple lanes of equipment, such that from one to twenty lines can be run. This could be, from one to twenty rotating discretizing elements connected and rotating together.

Step (a) Forming a Cavity

Step (a) provides a first water-soluble film moving in a first direction and forms a cavity in the first water-soluble film.

Step (b) Forming a Loaded Pocket

Step (b) provides a feed of first detergent particles to a rotating discretizing element comprising at least one pocket, wherein the rotating discretizing element rotates through a rotating arc, wherein the rotating arc has a first portion and a second portion, wherein the first detergent particles are dosed into the pocket when the pocket is in a position within the first portion of the rotating arc, to form a loaded pocket.

Step (c) Rotating the Loaded Pocket

Step (c) rotates the loaded pocket of the rotating discretizing element from the first portion of the rotating arc to the second portion of the rotating arc.

This rotation can be continuous or discontinuous, preferably the rotation is a continuous rotation.

Step (d) Forming a Loaded Cavity

Step (d) doses the first detergent particles from the loaded pocket to the cavity of the first water-soluble film when the loaded pocket is in a position within the second portion of the rotating arc, to form a loaded cavity.

Preferably, during step (d) from 0.05 g to 2.0 g of first detergent particles are dosed into the cavity of the first water-soluble film.

Optional Step (e) Dosing Second Detergent Ingredients to the Cavity

Step (e) is optional. Step (e) doses second detergent ingredients to the cavity of the first water-soluble film.

Preferably, step (e) is essential. Preferably, the detergent composition comprises first detergent particles and second detergent ingredients, wherein during step (e) second detergent ingredients are dosed to the cavity of the first water-soluble film, wherein during step (g) the first water-soluble film is sealed to the second water-soluble film and entraps at least a portion of the first detergent particle and at least a portion of the second detergent ingredients to form the first compartment.

Preferably, during step (e) from 5.0 g to 20 g of second detergent ingredients are dosed into the cavity of the first water-soluble film.

Preferably, the first detergent particles are dosed into the cavity of the first water-soluble film before the second detergent ingredients.

Step (f) Providing a Second Water-Soluble Film

Step (f) provides a second water-soluble film moving in the first direction, places the second water-soluble film over the cavity of the first water-soluble film and contacts the second water-soluble film to the first water-soluble film.

Preferably, the second water-soluble film introduced in step (f) forms part of a pre-formed second compartment and wherein after the sealing step (g) the water-soluble pouch comprises a first compartment and a second compartment.

Step (g) Forming the First Compartment

Step (g) seals the first water-soluble film to the second water-soluble film and entraps at least a portion of the first detergent particle and optionally at least a portion of the second detergent ingredients to form the first compartment.

Step (h) Repeating the Above Steps (a) to (g)

Step (h) repeating steps (a) to (g). The process is a continuous process.

Rotating Discretizing Element

The rotating discretizing element rotates through a rotating arc.

The rotating discretizing element comprises at least one pocket. Preferably, the rotating discretizing element comprises from five to twenty pockets. Typically, the volume of the pocket is from 0.5 to 20 ml preferably from 1 to 3 ml.

Preferably, the rotating discretizing element continuously rotates through the rotating arc. Alternatively, it may be suitable for the rotating discretizing element to discontinuously rotate through the rotating arc. In this discontinuous manner, the rotating discretizing element will typically come to rest and not rotate for a portion of time (usually minimal) during it rotation around the rotation arc.

The rotating discretizing element (1) is typically structured so that it comprises: (a) a central rotating element (2) that comprises multiple pockets (3) that are separated by non-pocket portions (4); and (b) a non-rotating outer sheath (5). The outer sheath (5) typically comprises a dosing channel (6). The dosing channel (6) is typically a channel cut through the outer sheath (5) that allows ingredients (7), such as the first detergent particles, to be dosed from outside the outer sheath (5), through the outer sheath (5), and into the pocket (3) when a pocket (3) of the central rotating element (2) lines up with the dosing channel (6). In this manner, the ingredients (7), such as the first detergent particles, wait in the dosing channel (6) until the pocket (3) of the central rotating element (2) is lined up with the dosing channel (6), at which point the ingredients (7), such as the first detergent particles, can enter the pocket (3) to form a loaded pocket. Once the pocket (3) has moved away from the dosing channel (6), the ingredients (7), such as the first detergent particles, wait in the dosing channel (6) as they cannot move past the non-pocket portion (4) of the central rotating element (2). Typically, in this configuration the ingredients (7), such as the first detergent particles, are gravity fed into the pocket (3) of the rotating discretizing element (2).

By varying the rotational speed of the rotating discretizing element in the manner according to the present disclosure, the speed at which the pocket (3) is lined up with the dosing channel (6) and allows the ingredients (7), such as the first detergent particles, to flow into the pocket (3), can be controlled so that the desired amount of ingredients (7), such as the first detergent particles, are loaded into the pocket (3). Once the loaded pocket (3) moves away from the dosing channel (6), e.g., such that no more ingredients (7), such as the first detergent ingredients, can flow into the pocket (3), the rotating speed of the rotating discretizing element can be changed.

This change in rotational speed can then be utilized to match the frequency at which the ingredients (7), such as the first detergent particles, can be dosed into the cavity (8).

Typically, the rotating discretizing element comprises a transfer zone (9). Typically, the outer sheath (5) comprises the transfer zone (9). The transfer zone (9) is typically a channel cut through the outer sheath (5) that allows ingredients (7), such as the first detergent particles, to be dosed from the loaded pocket (3), through the outer sheath (5), and into the cavity (8) when the loaded pocket (3) of the central rotating element (2) lines up with the transfer zone (9).

In this manner of varying the rotational speed, the rotating speed of the rotating discretizing element can be used not only to control the amount of ingredients (7), such as the first detergent particles, dosed during the process, but can also match the speed and rate at which the cavities are transferred during the process. This means that accurate dosing of the first detergent particles into the detergent composition of the detergent water-soluble pouch can be achieved whilst also avoiding that the speed of this dosing step becomes the rate limiting step of the continuous process.

In the above configuration, the outer sheath (5) is as flush to the central rotating element (2) as possible, whilst still allowing the central rotating element (2) to rotate freely, e.g., with little or no resistance caused by outer sheath (5).

The rotating discretizing element (1) is typically structured so that it comprises: (a) a central rotating element (2) that comprises multiple pockets (3) that are separated by non-pocket portions (4); and (b) a non-rotating outer sheath (5). The outer sheath (5) typically comprises a dosing channel (6). The dosing channel (6) is typically a channel cut through the outer sheath (5) that allows ingredients (7), such as the first detergent particles, to be dosed from outside the outer sheath (5), through the outer sheath (5), and into the pocket (3) when a pocket (3) of the central rotating element (2) lines up with the dosing channel (6). In this manner, the ingredients (7), such as the first detergent particles, wait in the dosing channel (6) until the pocket (3) of the central rotating element (2) is lined up with the dosing channel (6), at which point the ingredients (7), such as the first detergent particles, can enter the pocket (3) to form a loaded pocket. Once the pocket (3) has moved away from the dosing channel (6), the ingredients (7), such as the first detergent particles, wait in the dosing channel (6) as they cannot move past the non-pocket portion (4) of the central rotating element (2). Typically, in this configuration the ingredients (7), such as the first detergent particles, are gravity fed into the pocket (3) of the rotating discretizing element (2).

By varying the rotational speed of the rotating discretizing element in the manner according to the present disclosure, the speed at which the pocket (3) is lined up with the dosing channel (6) and allows the ingredients (7), such as the first detergent particles, to flow into the pocket (3), can be controlled so that the desired amount of ingredients (7), such as the first detergent particles, are loaded into the pocket (3). Once the loaded pocket (3) moves away from the dosing channel (6), e.g., such that no more ingredients (7), such as the first detergent ingredients, can flow into the pocket (3), the rotating speed of the rotating discretizing element can be changed.

This change in rotational speed can then be utilized to match the frequency at which the ingredients (7), such as the first detergent particles, can be dosed into the cavity (8).

Typically, the rotating discretizing element comprises a transfer zone (9). Typically, the outer sheath (5) comprises the transfer zone (9). The transfer zone (9) is typically a channel cut through the outer sheath (5) that allows ingredients (7), such as the first detergent particles, to be dosed from the loaded pocket (3), through the outer sheath (5), and into the cavity (8) when the loaded pocket (3) of the central rotating element (2) lines up with the transfer zone (9).

Detergent Water-Soluble Pouch

The detergent water-soluble pouch comprises a first compartment that is enclosed by a first water-soluble film and a second water-soluble film, wherein the first water-soluble film is sealed to the second water-soluble film, wherein the first compartment comprises detergent composition, and wherein the detergent composition comprises first detergent particles and optionally second detergent ingredients.

The detergent water-soluble pouch can be a water-soluble automatic dishwashing detergent pouch or a water-soluble automatic laundry detergent pouch. Preferably, the detergent water-soluble pouch is a water-soluble automatic dishwashing detergent pouch.

First Compartment

The first compartment is enclosed by a first water-soluble film and a second water-soluble film. The first compartment is formed by sealing the first water-soluble film to the second water-soluble film. The first compartment comprises detergent composition, the detergent composition comprises first detergent particles and optionally second detergent ingredients.

Optional Second Compartment

Preferably, the second water-soluble film introduced in step (f) forms part of a pre-formed second compartment and wherein after the sealing step (g) the water-soluble pouch comprises a first compartment and a second compartment.

First Water-Soluble Film

The first water-soluble film is sealed to the second water-soluble film to form the first compartment.

Second Water-Soluble Film

The second water-soluble film is sealed to the first water-soluble film to form the first compartment.

Detergent Composition

The detergent composition comprises first detergent particles and optionally second detergent ingredients. Preferably, the detergent composition is a detergent powder composition.

Alternatively, the detergent composition can be a detergent liquid composition or a liquid gel composition. In this manner, the second detergent ingredients can be in liquid and/or gel form when dosed to the cavity.

First Detergent Particles

During step (b) a continuous feed of first detergent particles are provided to a rotating discretizing element comprising at least one pocket.

Preferably, the first detergent particles comprise enzyme.

Optional Second Detergent Ingredients

During the optional step (e) second detergent ingredients may be dosed to the cavity of the first water-soluble film.

Preferably, the second detergent ingredients are second detergent particles.

Preferably, the second detergent ingredients comprise chelant and/or bleach.

Embodiments of the Present Disclosure

1. A continuous method of manufacturing a detergent water-soluble pouch, wherein the pouch comprises a first compartment that is enclosed by a first water-soluble film and a second water-soluble film, wherein the first water-soluble film is sealed to the second water-soluble film, wherein the first compartment comprises detergent composition, wherein the detergent composition comprises first detergent particles and optionally second detergent ingredients, wherein the method comprises the steps of:
   - (a) providing a first water-soluble film moving in a first direction, and forming a cavity in the first water-soluble film;
   - (b) providing a feed of first detergent particles to a rotating discretizing element comprising at least one pocket, wherein the rotating discretizing element rotates through a rotating arc, wherein the rotating arc has a first portion and a second portion, wherein the first detergent particles are dosed into the pocket when the pocket is in a position within the first portion of the rotating arc, to form a loaded pocket;
   - (c) rotating the loaded pocket of the rotating discretizing element from the first portion of the rotating arc to the second portion of the rotating arc,
   - (d) dosing the first detergent particles from the loaded pocket to the cavity of the first water-soluble film when the loaded pocket is in a position within the second portion of the rotating arc, to form a loaded cavity;
   - (e) optionally, dosing second detergent ingredients to the cavity of the first water-soluble film;
   - (f) providing a second water-soluble film moving in the first direction, and placing the second water-soluble film over the cavity of the first water-soluble film and contacting the second water-soluble film to the first water-soluble film;
   - (g) sealing the first water-soluble film to the second water-soluble film and entrapping the first detergent particles and optionally the second detergent ingredients to form the first compartment; and
   - (h) repeating steps (a) to (g);

wherein the rotating discretizing element rotates at variable speeds, wherein the rotating speed of the rotating discretizing element when the pocket is not in a position within the first portion of the rotating arc is controlled so that the dosing of the first detergent particles into the cavity during step (d) is matched to the frequency at which the cavity passes through the position from which it can be filled with first detergent particles.

2. A method according to embodiment 1, wherein the detergent composition comprises first detergent particles and second detergent ingredients, wherein during step (e) second detergent ingredients are dosed to the cavity of the first water-soluble film, wherein during step (g)

the first water-soluble film is sealed to the second water-soluble film and entraps the first detergent particles and the second detergent ingredients to form the first compartment.

3. A method according to any preceding embodiment, wherein the second detergent ingredients are second detergent particles.
4. A method according to any preceding embodiment, wherein the first detergent particles are dosed into the cavity of the first water-soluble film before the second detergent ingredients.
5. A method according to any preceding embodiment, wherein the first detergent particles comprise enzyme.
6. A method according to any preceding embodiment, wherein the second detergent ingredients comprise chelant and/or bleach.
7. A method according to any preceding embodiment, wherein during step (d) from 0.05 g to 2.0 g of first detergent particles are dosed into the cavity of the first water-soluble film.
8. A method according to any preceding embodiment, wherein during step (e) from 5.0 g to 20 g of second detergent ingredients are dosed into the cavity of the first water-soluble film.
9. A method according to any preceding embodiment, wherein the rotational speed of the rotating discretizing element during the first portion of the rotating arc when the first detergent particles are dosed into the pocket to form a loaded pocket is higher than the average rotational speed of the rotating discretizing element during the remainder of the rotating arc.
10. A method according to any preceding embodiment, wherein the second water-soluble film introduced in step (f) forms part of a pre-formed second compartment and wherein after the sealing step (g) the water-soluble pouch comprises a first compartment and a second compartment.
11. A method according to any preceding embodiment, wherein the rotating discretizing element comprises from five to twenty pockets.
12. A method according to any preceding embodiment, wherein the change in rotating speed of the rotating discretizing element occurs between the steps of loading two subsequent pockets.
13. A method according to any preceding embodiment, wherein the rotating discretizing element continuously rotates through the rotating arc.
14. A method according to any preceding embodiment, wherein the water-soluble pouch is a water-soluble automatic dishwashing detergent pouch.
15. A method according to any of embodiments 1-13, wherein the water-soluble pouch is a water-soluble automatic laundry detergent pouch.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

Every document cited herein, including any cross referenced or related patent or application, is hereby incorporated herein by reference in its entirety unless expressly excluded or otherwise limited. The citation of any document is not an admission that it is prior art with respect to anything disclosed or claimed herein or that it alone, or in any combination with any other reference or references, teaches, suggests or discloses any of this disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A continuous method of manufacturing a detergent water-soluble pouch, wherein the pouch comprises a first compartment that is enclosed by a first water-soluble film and a second water-soluble film, wherein the first water-soluble film is sealed to the second water-soluble film, wherein the first compartment comprises detergent composition, wherein the detergent composition comprises first detergent particles and optionally second detergent ingredients, wherein the method comprises the steps of:

(a) providing the first water-soluble film moving in a first direction, and forming a cavity in the first water-soluble film;
(b) providing a feed of first detergent particles to a rotating discretizing element comprising at least one pocket, wherein the rotating discretizing element rotates through a rotating arc, wherein the rotating arc has a first portion and a second portion, wherein the first detergent particles are dosed into the pocket when the pocket is in a position within the first portion of the rotating arc, to form a loaded pocket;
(c) rotating the loaded pocket of the rotating discretizing element from the first portion of the rotating arc to the second portion of the rotating arc,
(d) dosing the first detergent particles from the loaded pocket to the cavity of the first water-soluble film when the loaded pocket is in a position within the second portion of the rotating arc, to form a loaded cavity;
(e) dosing second detergent ingredients to the cavity of the first water-soluble film;
(f) providing the second water-soluble film moving in the first direction, and placing the second water-soluble film over the cavity of the first water-soluble film and contacting the second water-soluble film to the first water-soluble film;
(g) sealing the first water-soluble film to the second water-soluble film and entrapping the first detergent particles and optionally the second detergent ingredients to form the first compartment; and (h) repeating steps (a) to (g);

wherein the rotating discretizing element rotates at variable speeds, wherein a rotating speed of the rotating discretizing element when the pocket is not in a position within the first portion of the rotating arc is controlled so that the dosing of the first detergent particles into the cavity during step (d) is matched to the frequency at which the cavity passes through the position from which it can be filled with first detergent particles.

2. A method according to claim 1, wherein the detergent composition comprises first detergent particles and second detergent ingredients, wherein during step (e) second detergent ingredients are dosed to the cavity of the first water-soluble film, wherein during step (g) the first water-soluble film is sealed to the second water-soluble film and entraps the first detergent particles and the second detergent ingredients to form the first compartment.

3. A method according to claim 1, wherein the second detergent ingredients are second detergent particles.

4. A method according to claim 1, wherein the first detergent particles are dosed into the cavity of the first water-soluble film before the second detergent ingredients.

5. A method according to claim 1, wherein the first detergent particles comprise enzyme.

6. A method according to claim 1, wherein the second detergent ingredients comprise chelant and/or bleach.

7. A method according to claim 1, wherein during step (d) from about 0.05 g to about 2.0 g of first detergent particles are dosed into the cavity of the first water-soluble film.

8. A method according to claim 1, wherein during step (e) from about 5.0 g to about 20 g of second detergent ingredients are dosed into the cavity of the first water-soluble film.

9. A method according to claim 1, wherein the rotational speed of the rotating discretizing element during the first portion of the rotating arc when the first detergent particles are dosed into the pocket to form a loaded pocket is higher than the average rotational speed of the rotating discretizing element during the remainder of the rotating arc.

10. A method according to claim 1, wherein the second water-soluble film introduced in step (f) forms part of a pre-formed second compartment and wherein after the sealing step (g) the water-soluble pouch comprises a first compartment and a second compartment.

11. A method according to claim 1, wherein the rotating discretizing element comprises from five to twenty pockets.

12. A method according to claim 1, wherein the change in rotating speed of the rotating discretizing element occurs between the steps of loading two subsequent pockets.

13. A method according to claim 1, wherein the rotating discretizing element continuously rotates through the rotating arc.

14. A method according to claim 1, wherein the water-soluble pouch is a water-soluble automatic dishwashing detergent pouch.

15. A method according to claim 1, wherein the water-soluble pouch is a water-soluble automatic laundry detergent pouch.

* * * * *